C. BOOTH.
LOCKING DEVICE FOR DEMOUNTABLE WHEELS.
APPLICATION FILED APR. 11, 1917.

1,273,320.

Patented July 23, 1918.

Inventor:
Clement Booth,
By Chas. N. Butler
Attorney.

UNITED STATES PATENT OFFICE.

CLEMENT BOOTH, OF NARBERTH, PENNSYLVANIA.

LOCKING DEVICE FOR DEMOUNTABLE WHEELS.

1,273,320.  Specification of Letters Patent.  Patented July 23, 1918.

Application filed April 11, 1917. Serial No. 161,149.

*To all whom it may concern:*

Be it known that I, CLEMENT BOOTH, a citizen of the United States, residing at Narberth, Montgomery county, Pennsylvania, have invented an Improved Locking Device for Demountable Wheels, of which the following is a specification.

My invention comprises improved locking mechanism of simple and efficient character designed primarily for holding in operative position the demountable members of wire wheels, and it is embodied in a nut adapted for holding the parts of the hub in operative relation and a device for fixing said nut in place, the preferred form of the invention comprising a nut having concentric parts provided with threads and a nut adapted to screw into the outer part and into wedging engagement with the inner part for the purpose of fixing it on the part with which it is engaged.

The characteristic features of my invention are more fully set out in the following description and the accompanying drawings, in which—

Figure 1:
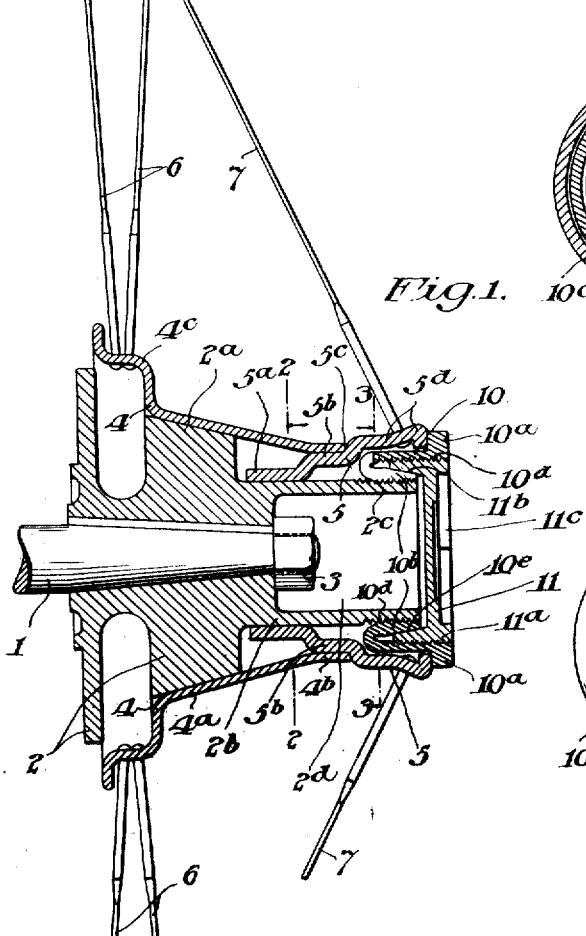
Figure 1:
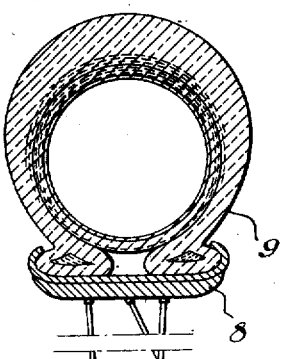
Figure 2:
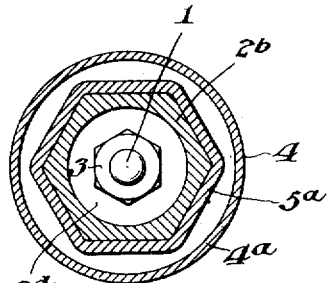
Figure 3:
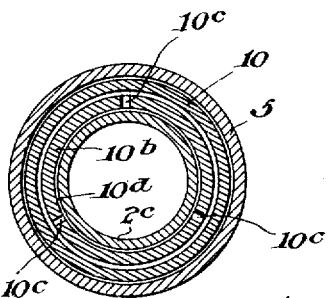
Figure 4:
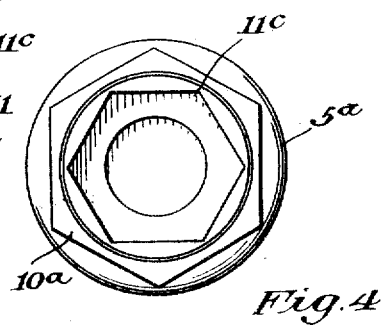

Figure 1 is a part sectional elevation of a wheel having my invention applied thereto; Fig. 2 is a sectional view on the line 2—2 of Fig. 1; Fig. 3 is a sectional view on the line 3—3 of Fig. 1; and Fig. 4 is an end view of the hub, including its cap and locking device.

As shown in the drawings, the driving shaft 1 has splined thereon the hub body 2 provided with a tapered section $2^a$, a hexagonal section $2^b$ and a cylindrical threaded part $2^c$, the body being secured on the shaft by a nut 3 within the recess $2^d$ in the outer part of the body.

A shell and outer hub section 4 is sleeved on the body 2 and has a tapered section $4^a$ fitting closely on the section $2^a$. A second, preferably heavier, shell and outer hub section 5 is sleeved on the body 2 and has the hexagonal section $5^a$ engaged on the hexagonal section $2^b$, the section $5^b$ telescoped within the outer end $4^b$ of the shell 4, the shoulder $5^c$ abutting against the end $4^b$, and the outer section $5^d$ surrounding the threaded section $2^c$.

Inner spokes 6 and outer spokes 7 respectively connect the inner part $4^c$ of the shell 4 and the outer part $5^d$ of the shell 5 with the wheel rim 8 having the tie 9 thereon.

The demountable wheel is locked in place by a compound nut comprising the cylindrical body 10 adapted to pass within the part $5^d$, the flange $10^a$ extending outwardly from the body for engagement with the outer end of the parts $5^d$, and the sections $10^b$ turned inwardly from the body to concentric relation therewith, the sections $10^b$ being separated by the slots $10^c$ and having threads $10^d$ for engaging the threaded section $2^c$.

A nut 11 is provided with an external thread $11^a$ for engaging the internal thread $10^d$ on the outer ring or body 10 and an internal conical surface $11^b$ for engaging the external conical surface $10^e$ of the inner split ring formed by the sections $10^b$, for effecting a wedging action to spring the latter inwardly into firmly gripping relation to the part $2^c$, the nut 11 having a hexagonal socket $11^c$ for the engagement of a wrench.

The foregoing mechanism comprises few and simple parts, readily produced and operated and affords an efficient and secure lock.

The demountable wheel, when mounted on the hub body, drives through the interlocking hexagonal sections $2^b$ and $5^a$, the section 5 being held in place and holding the section 4 in place simply and securely by screwing the resilient nut sections $10^b$ on the section $2^c$, and the nut 11 into the nut body 10 so as to press the parts $10^b$ against the part $2^c$.

Having described my invention, I claim:

1. The combination with fixed and demountable hub sections, of a nut having a part engaging one of said sections and a part engaging the other of said sections to hold them together, and a wedging device acting between said parts for locking said nut.

2. The combination with fixed and demountable hub sections, of a device comprising concentric members for securing said sections together, the inner of said members being divided and threaded to engage a threaded portion of one of said sections and the outer of said members engaging the other of said sections, and a device having a wedging engagement with said inner member and a threaded engagement with said outer member.

3. The combination with a hub body and a shell sleeved thereon, of a nut comprising an inner threaded split ring adapted to be screwed on said body and an outer threaded ring having a flange adapted for engaging said shell, said split ring having a bevel, and a nut having a thread adapted for engaging the thread of said outer ring and a bevel adapted for engaging said bevel first named to clamp said split ring to said hub body.

4. The combination of an inner member, an outer member, a device having inner and outer parts adapted for engaging said inner and outer members respectively, and a second device adapted for making a positive engagement with one of said parts and a wedging engagement with the other of said parts for locking said device first named.

5. The combination of an inner member, an outer member, a nut having a body provided with a flange adapted for engaging said outer member and a conical part within said body adapted for engaging said inner member, and a nut adapted for engaging said body and having a conical part adapted for engaging said conical part first named.

6. The combination of an inner threaded part, an outer part having an interlocking engagement with said inner part, a nut provided with an internally threaded body having an outwardly extending flange adapted for engaging said outer member and inturned resilient threaded parts adapted for engaging said inner part, and a nut adapted for pressing said resilient part against said inner part and having an external thread adapted for engaging said threaded body.

In testimony whereof I have hereunto set my name this 10th day of April, 1917.

CLEMENT BOOTH.